(12) United States Patent
Petracca et al.

(10) Patent No.: US 10,423,741 B1
(45) Date of Patent: Sep. 24, 2019

(54) CONSTRAINED METRIC VERIFICATION ANALYSIS OF A SYSTEM ON CHIP

(71) Applicant: Cadence Design Systems, Inc., San Jose, CA (US)

(72) Inventors: Michele Petracca, Chappaqua, NY (US); Yosinori Watanabe, Lafayette, CA (US); Yael Kinderman, Giv'at Shmuel (IL); Shlomi Uziel, Neve Ilan (IL); Ido Avraham, Netanya (IL)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 62 days.

(21) Appl. No.: 15/814,295

(22) Filed: Nov. 15, 2017

(51) Int. Cl.
*G06F 17/50* (2006.01)
*G06F 17/10* (2006.01)
*G06F 17/15* (2006.01)
*G09B 5/02* (2006.01)
*G06F 17/18* (2006.01)
*G06Q 50/20* (2012.01)

(52) U.S. Cl.
CPC .......... *G06F 17/5022* (2013.01); *G06F 17/15* (2013.01); *G06F 17/18* (2013.01); *G09B 5/02* (2013.01); *G06Q 50/20* (2013.01)

(58) Field of Classification Search
CPC ...... G06F 15/15; G06F 17/18; G06F 17/5022; G09B 5/02
USPC .......................................... 716/101, 106, 138
See application file for complete search history.

(56) References Cited

U.S. PATENT DOCUMENTS

| | | | | |
|---|---|---|---|---|
| 7,111,275 B2 * | 9/2006 | Chen et al. | ......... | G06F 17/5022 716/111 |
| 8,065,107 B1 * | 11/2011 | Phatak | ............. | G05B 19/41865 702/123 |
| 8,346,516 B2 * | 1/2013 | Misra | ..................... | G06Q 10/00 703/2 |
| 10,084,476 B1 * | 9/2018 | Zhao et al. | ......... | H03M 7/3084 |

* cited by examiner

*Primary Examiner* — Sun J Lin
(74) *Attorney, Agent, or Firm* — McDermott Will & Emery LLP

(57) ABSTRACT

A method including selecting multiple input parameters of a device configuration environment to perform multiple simulations on an electronic device defined by the device configuration environment is provided. The method with multiple values for the multiple input parameters and a value of an output parameter resulting from the multiple simulations, and extracting a distribution of output parameter values and a distribution of input parameter values from a database. The method also includes finding a correlation involving the multiple input parameters and the output parameter based on a target range of the output parameter, and identifying an expected value of the output parameter using a range of values of the multiple input parameters in the correlation involving the multiple input parameters and the output parameter. A system and a nontransitory, computer-readable medium including instructions to perform the above method are also provided.

19 Claims, 15 Drawing Sheets

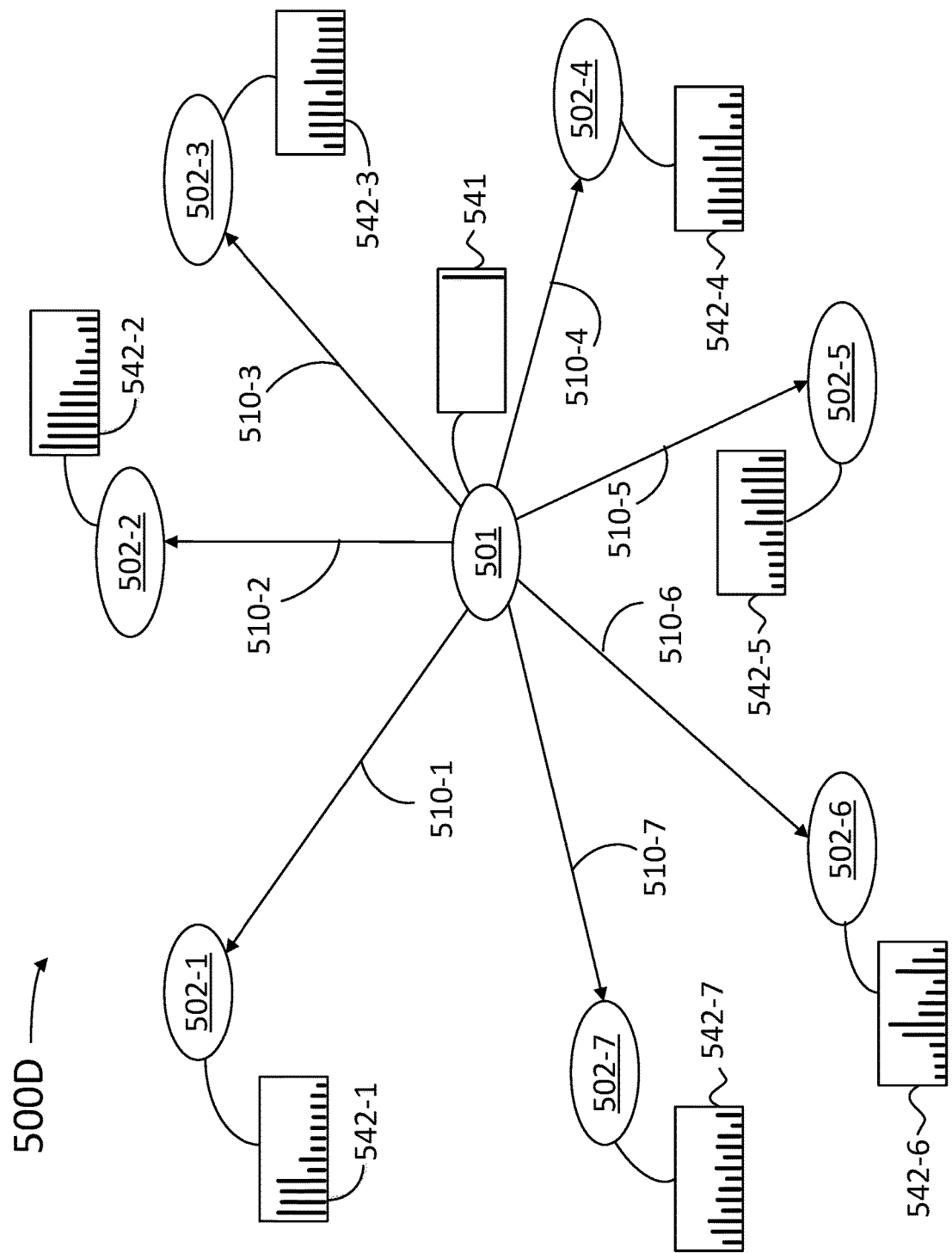

CONSTRAINED METRIC VERIFICATION ANALYSIS OF A SYSTEM ON CHIP

TECHNICAL FIELD

Embodiments described herein are generally related to the field of constrained statistical analysis of integrated circuit designs. More specifically, embodiments described herein are related to methods for performing a constrained analysis of integrated circuit designs including hardware and software.

BACKGROUND

Current integrated circuit (IC) design is largely dedicated to large systems integrating software and hardware to perform multiple tasks simultaneously, or almost simultaneously. Some of these designs include system on a chip (SoC) configurations, typically designed to execute different applications that compete for system resources (e.g., memory, processor time, and bus bandwidth). Due to a large number of operating parameters to consider, system designers typically explore obvious extreme parameter corners that may render inefficient design architectures having inefficient performance, or leading the system designer to an unwarranted conclusion about the design. Moreover, some combinations of parameter values may be overlooked, resulting in system flaws that may be unrecoverable in certain situations. Also, in some situations it may be desirable for a designer to perform a "what if" analysis, in which input parameters are constrained to pre-selected values to determine what is the outcome in SoC performance. In such circumstances, it is desirable to have a tool that systematically and exhaustively explores the parameter space to find areas with an increased likelihood to find flaws in the design, and to reduce the computational time it takes to find these parameter space areas.

The description provided in the background section should not be assumed to be prior art merely because it is mentioned in or associated with the background section. The background section may include information that describes one or more aspects of the subject technology.

SUMMARY

In certain aspects, a computer-implemented method includes selecting multiple input parameters of a device configuration environment to perform multiple simulations on an electronic device defined by the device configuration environment. The computer-implemented method also includes populating a database with multiple values for the input parameters and a value of an output parameter resulting from the simulations, and extracting a distribution of output parameter values and a distribution of input parameter values from the database. The computer-implemented method also includes finding a correlation involving the input parameters and the output parameter based on a target range of the output parameter, and identifying an expected value of the output parameter using a range of values of the input parameters in the correlation involving the input parameters and the output parameter.

In certain aspects, a system is described. The system includes a memory storing instructions, and at least one processor that executes the instructions to select multiple input parameters of a device configuration environment to perform multiple simulations on an electronic device defined by the device configuration environment and to populate a database with multiple values for the input parameters and a value of an output parameter resulting from the simulations. The at least one processor further executes instructions to extract a distribution of output parameter values and a distribution of input parameter values from the database, to find a correlation between the input parameter and the output parameter based on a target range of the output parameter, and to identify an expected value of the output parameter using a value of the input parameter in the correlation between the input parameter and the output parameter.

In certain aspects, a non-transitory, machine-readable storage medium is described that includes machine-readable instructions for causing a processor to execute a method. The method includes determining multiple output parameters of an electronic device defined by a device configuration comprising an input parameter and populating a database with the input parameter and the multiple output parameters. The method also includes extracting a distribution of output parameter values and a distribution of input parameter values from the database, finding a correlation between the input parameter and the output parameter based on a target range of the output parameter, and identifying an expected value of the output parameter using a value of the input parameter from an arbitrary device configuration in the correlation between the input parameter and the output parameter.

In certain aspects, a system is described including a means for storing instructions. The system further includes a means to execute the instructions to select multiple input parameters of a device configuration environment to perform multiple simulations on an electronic device defined by the device configuration environment and to populate a database with multiple values for the input parameters and a value of an output parameter resulting from the simulations. The means to execute the instructions further executes instructions to extract a distribution of output parameter values and a distribution of input parameter values from the database, to find a correlation between the input parameter and the output parameter based on a target range of the output parameter, and to identify an expected value of the output parameter using a value of the input parameter in the correlation between the input parameter and the output parameter.

BRIEF DESCRIPTION OF THE DRAWINGS

FIGS. 5A-H illustrate dependency charts in a constrained metric verification engine, according to some embodiments.

In the figures, elements and steps denoted by the same or similar reference numerals are associated with the same or similar elements and steps, unless indicated otherwise.

DETAILED DESCRIPTION

Figure 1:
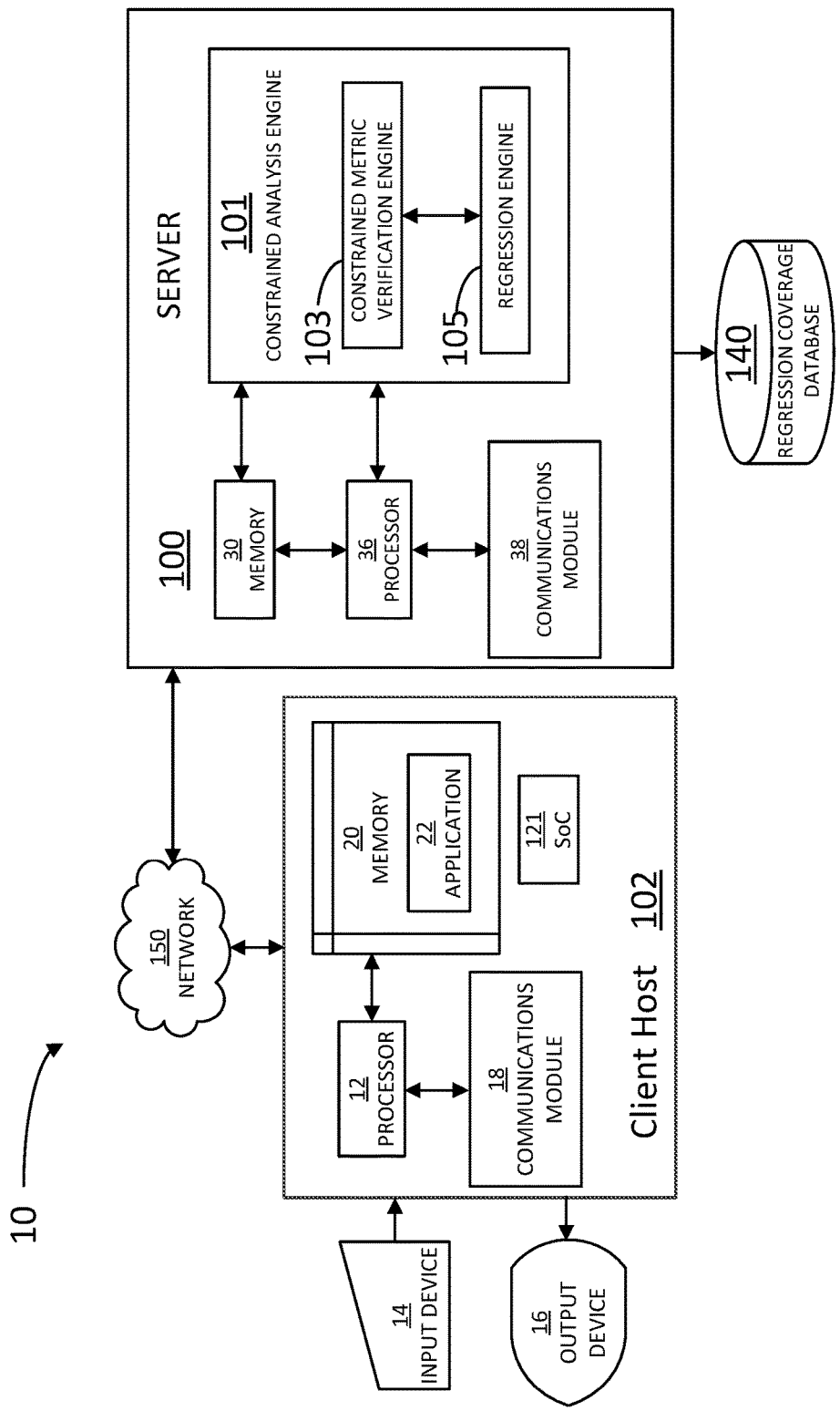
FIG. 1 illustrates an architecture configured to perform constrained metric verification analysis of a SoC, according to some embodiments.

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

Embodiments disclosed herein include a constrained analysis engine for providing constrained analysis of a system architecture (e.g., a SoC) using simulation data obtained with suitably combined parameters to address a target range of values for an output parameter. A constrained analysis allows a designer to explore areas of a device parameter space to model the system architecture according to a specific environment and input parameter values. The environment may include physical environmental properties such as temperature, or user-related properties such as rate of use (e.g., data traffic, network conditions, and the like), and type of application. SoC designers make use of multiple input blocks including memories, processors, and the like, e.g., "external devices and software." External devices and software may be provided by multiple vendors and have device parameters that can be adjusted by the designer when assembling the multiple devices into a SoC. During assembly, in some embodiments the designer may use an application that configures the parameters for the different external devices and software to study the performance of the SoC to identify device parameters that may be changed, and how. In some embodiments, multiple external device and software blocks (e.g., "Verification IPs"), each with their set of parameters, may be assembled to create a complex verification environment.

In some embodiments, and without limitation, a constrained analysis engine as disclosed herein also includes a software parameter for a SoC, such as logic commands, in addition to hardware properties (e.g., a compiler parameter). Compiler parameters may determine the type of executable program that runs the SoC, which may impact its performance. In some embodiments, a software parameter for a SoC may include a specific algorithm implementation to achieve the same result (e.g., the same type of hardware control or data processing). Further, in some embodiments software parameters may include different constants to, for instance, change the degree of accuracy, the precision, the amount of buffering, or the number of processes or threads in an application. In some embodiments, software parameters for a SoC may involve a tradeoff between speed, power requirements, resource footprint, signal-to-noise ratios, and the like, which the designer may desire to evaluate in detail. Further, software parameters for a SoC in embodiments consistent with the present disclosure may include a selection of whether to run an algorithm on a central processing unit (CPU), or in a graphics processing unit (GPU). In this regard, the designer may desire to evaluate trade-offs between power requirements, performance, and complexity by selecting between CPU and GPU execution.

In SoC design, three types of properties available to the designer may be distinguished. A first type includes properties that can be directly configured (controllable properties) by the designer. For example, some controllable properties of a system may include the depth of a first-in-first-out (FIFO) buffer, a memory size (e.g., in kilo-bytes KB, mega-bytes MB, giga-bytes GB, and the like) or the clock frequency at which certain circuit component operates, or a bus bandwidth. Other controllable properties may include a bandwidth of a port (input/output) in a bus or a memory interface, or a read/write weight ratio in the port. The designer sets proper values for the controllable properties to optimize the design. A second type includes properties that the designer may desire to monitor during simulation (observable properties). Observable properties may describe the "quality" of the design. One example of an observable property may include the latency of a given operation (e.g., a command execution such as a read/write operation, or a logic operation, or a hardware reconfiguration), or a device bandwidth (e.g., usage of an IP for a selected operation or function). Without limitation, the designer may have no control as to the value of an observable property. Accordingly, the designer may set up quantitative measurements of the observable properties to collect data during simulation. A third type includes properties of the environment (environmental properties) in which the design is expected operate. The designer does not control these properties, (e.g., the use rate of the SoC and the like). In some embodiments, the environmental properties may be included in the constrained analysis engine as test bench parameters to evaluate the performance of a SoC under different conditions. In what follows, and without limitation, controlled properties and environmental properties will be lumped together as "input parameters," and at least some observable properties will be referred to as "output parameters."

In some embodiments, a constrained analysis engine may use a regression coverage database storing data obtained through a campaign of SoC simulations. Each simulation reports measurements for at least one output parameter under a certain device configuration determined by selected input parameters. Based on data collected from the measurements and stored in the system performance database, the constrained analysis engine renders a statistical model of the system that highlights the dependency of the "observable" featured from the "environment" and "controllable" ones. The resulting data enables the designer to predict the effect of the tests on the concerning verification metric(s) (e.g., after certain assumptions about the environment) and to configure the testing environment such as to bring a design under test (e.g., the SoC) to selected conditions during testing. Accordingly, the constrained analysis engine provides a profile of design parameters to achieve a desired performance of a SoC, including hardware and software.

The disclosed system addresses a technical problem tied to computer technology and arising in the realm of computer simulation of hardware, namely the technical problem of accurately analyzing the performance of a SoC having multiple device and software parameters. The disclosed system solves this technical problem by including a regression coverage database of simulation results accessible through an application that enables the designer to select, de-select, refine and explore different areas of a device (and software) parameter space, to perform detailed statistical analysis form the selected data, and to request further simulations in refined areas of the device and software parameter space.

Example System Architecture

FIG. 1 illustrates an architecture 10 configured to perform a constrained metric verification analysis of a SoC, according to some embodiments. A client host 102 includes a processor 12 configured to execute instructions stored in a memory 20. Memory 20 may include an application 22, which includes commands that when executed by processor 12 cause client host 102 to perform methods consistent with the present disclosure. Application 22 may include a runtime software program running on client host 102 to issue commands to server 100 for controlling a constrained analysis engine 101. For example, application 22 may include an application to control server 100 for SoC 121. SoC 121 may include a register transfer level (RTL) compiler language, e.g., an application specific integrated circuit (ASIC) RTL file configured to handle hardware and software that controls the hardware. Client host 102 may also include a communications module 18 that enables client host 102 to transfer data, provide commands and receive instructions from server 100 through a network 150. Client host 102 may be coupled with an input device 14 (e.g., a mouse, a keyboard, a touch screen display, and the like) and to an output device 16 (e.g., a display, a speaker, and the like). Accordingly, a user may enter commands and queries to client host 102 with input device 14, and receive graphic and other information from client host 102 via output device 16. In some embodiments, application 22 may control input device 14 and output device 16 through a graphic user interface (GUI), enabling a user to have access to server 100 and perform a constrained metric verification analysis on SoC 121.

Server 100 may include a memory 30, a processor 36, and a communications module 38 to transfer data, receive commands and provide instructions from client host 102 through network 150. Memory 30 and processor 36 may be communicatively coupled with a constrained analysis engine 101 that includes a constrained metric verification engine 103 and a regression engine 105. In some embodiments, constrained analysis engine 101 is configured to perform simulations of SoC 121 with selected input parameters to obtain selected output parameters and store the selected output parameters in regression coverage database 140. Regression engine 105 may perform an iterative regression analysis to develop a model, or correlation, between at least some of the input parameters and at least some of the output parameters. Constrained metric verification engine 103 may be configured to selectively apply constraints to input parameters and to output parameters before a simulation run, or after a simulation run, for data stored in and retrieved from regression coverage database 140. Accordingly, in some embodiments, constrained metric verification engine 103 may be configured to apply constraints so that the output parameter of at least some configurations resulting from the simulation and stored in regression coverage database 140 include a selected target range. Thereafter, regression engine 105 applies regression algorithms on the constrained data retrieved from regression coverage database 140. This process may be iterated a number of times, until the output parameter falls satisfactorily within the target range.

A regression coverage database 140 stores data results from multiple simulation samples on SoC 121 run with server 100. In some embodiments, regression coverage database 140 stores values of environmental properties, controllable properties, and observable properties resulting from multiple simulations of SoC 121.

In some embodiments, constrained analysis engine 101 initially performs simulations over a limited sampling of the device (and software) parameter space with selected system configurations. In the simulations, given a system configuration, a random selection of data traffic is provided to SoC 121 and the results of the simulations are stored in regression coverage database 140. For example, in some embodiments the random selection of data may include sets of video frames formed from random pixel values (e.g., when the SoC 121 is a video-cam controller). In some embodiments, the simulations may include sets of video frames selected at random from other video frames or pictures available to Server 100. The results stored in regression coverage database 140 may include values of selected observable properties of the SoC. Based on the results, and using machine-learning techniques from prior simulation history stored in regression coverage database 140, constrained metric verification engine 103 and regression engine 105 select additional simulation configurations to provide a refined analysis. Accordingly, constrained metric verification engine 103 and regression engine 105 increase the simulation and analysis efficiency by concentrating on areas of the parameter space for controllable and environmental properties that are critical for performance of SoC 121 (e.g., desirable ranges of one or more observable properties).

Figure 2:
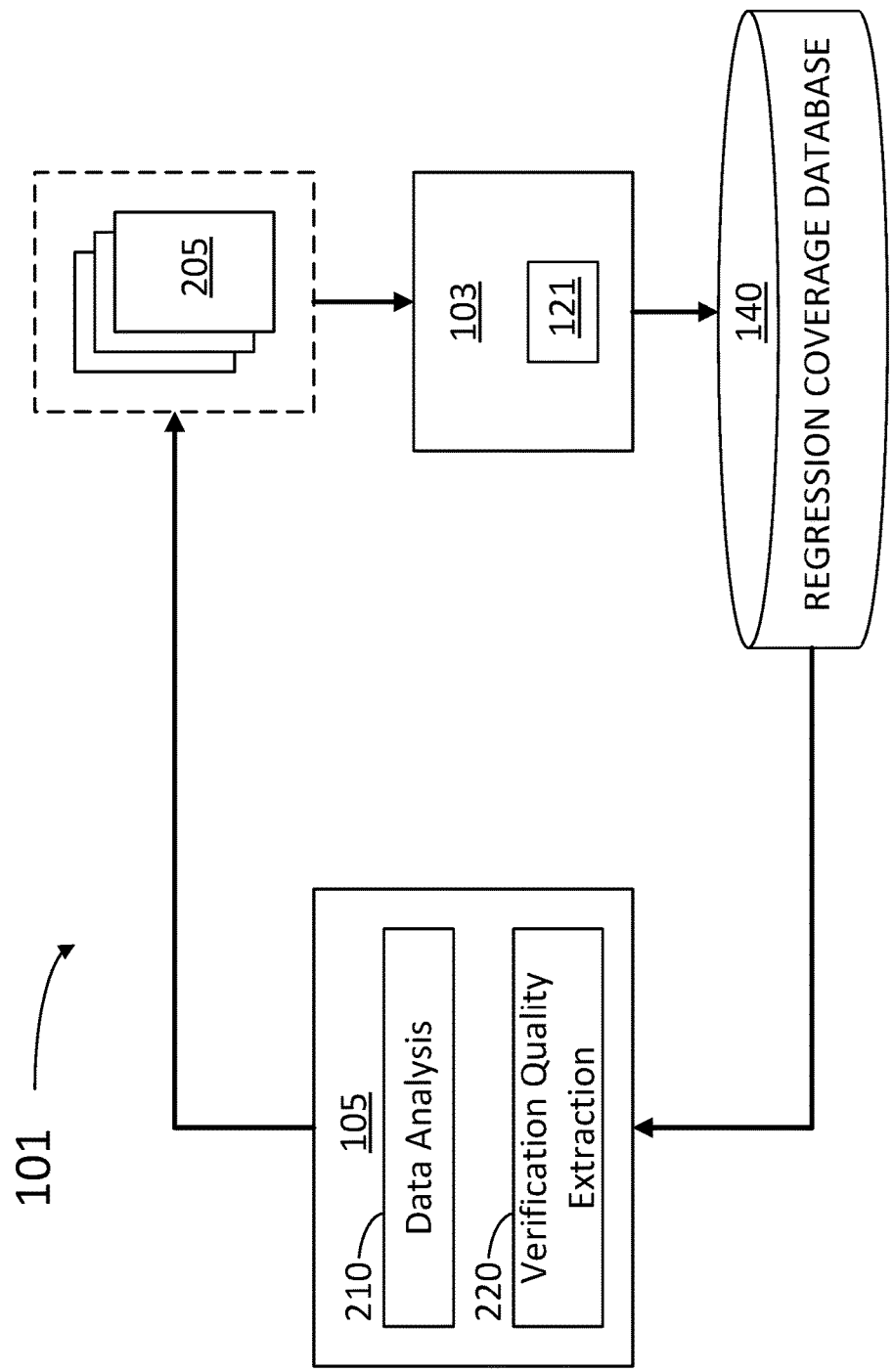
FIG. 2 illustrates a block diagram of an analysis engine for constrained metric verification of a SoC, according to some embodiments.

FIG. 2 illustrates a block diagram of a constrained analysis engine 101 for constrained metric verification of a SoC 121, according to some embodiments. Regression engine 105 includes a data analysis block 210 and a verification quality (VQ) extraction block 220. A dataset 205 is the input to constrained metric verification engine 103. In some embodiments, dataset 205 includes test intent and configuration data for SoC 121. Accordingly, analysis engine 105 performs a simulation of SoC given input parameters as selected by constrained metric verification engine 103 from dataset 205. The simulation results are stored in regression coverage database 140 to be used by regression engine 105. In an iterative process, regression engine 105 may provide a new dataset 205 based on the regression results, so as to bias the simulation coverage towards a specific target range, or target value.

Figure 3:
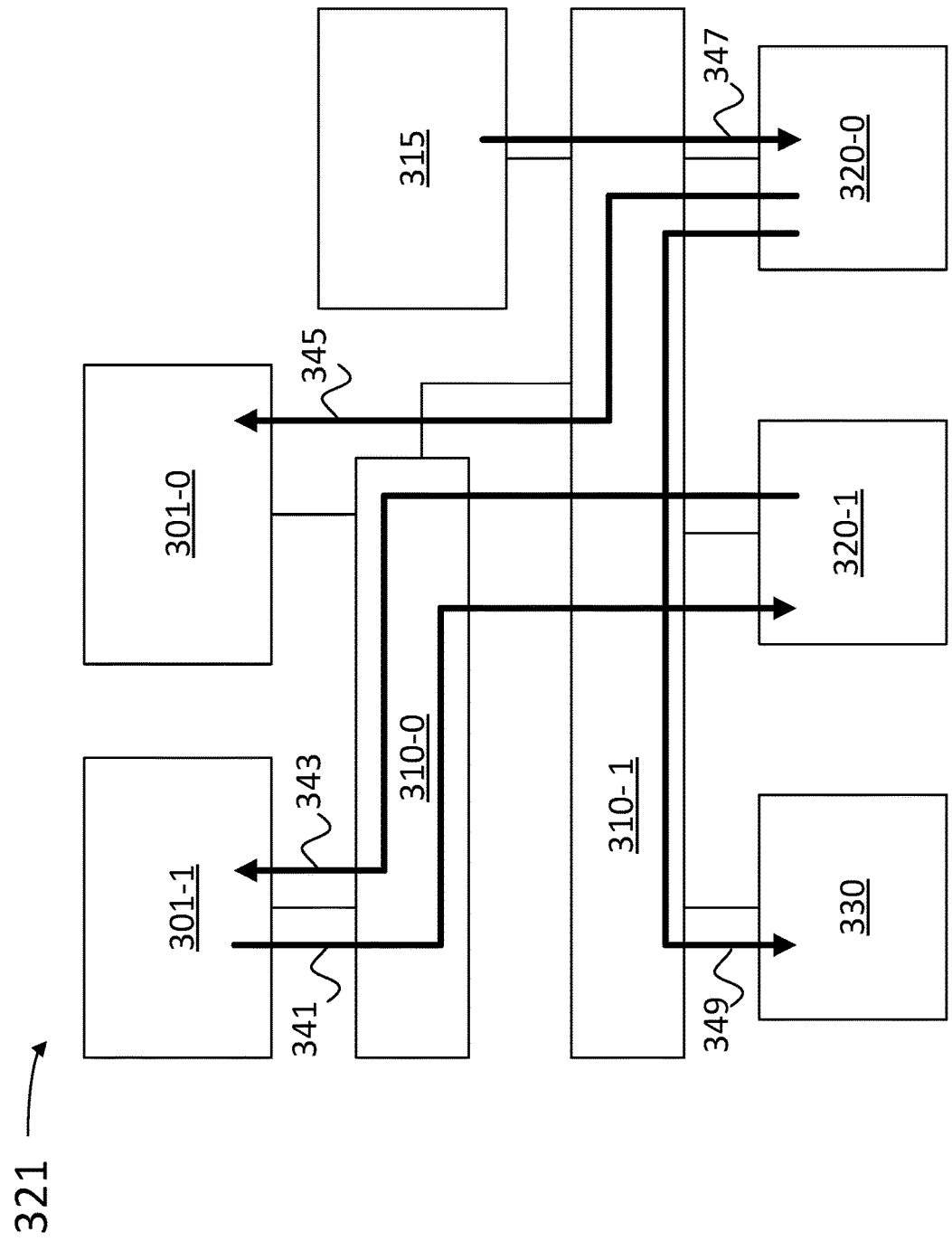
FIG. 3 illustrates a SoC configured to perform operations under controllable parameters and environmental parameters, according to some embodiments.

FIG. 3 illustrates a SoC 321 configured to perform operations in a configuration described by input parameters and output parameters (or concerns), according to some embodiments. The operations result in output (observable) parameters, desirably within a target coverage range. Without limitation, SoC 321 includes two central processing units (CPUs) 301-0 and 301-1 (collectively referred to, hereinafter, as "CPUs 301"), and two memories 320-0 and 320-1 (collectively referred to, hereinafter, as "memories 320"). Memories 320 may include volatile memories such as FIFO buffers, random access memories (RAMs) including dynamic RAMs (DRAMs), static RAMs (SRAMs), and the like. In some embodiments, memories 320 may also include non-volatile memories such as a flash memory, a disk memory (e.g., a hard drive), or any other magnetic device. CPUs 301 are coupled with memories 320 through buses 310-0 and 310-1 (collectively referred to, hereinafter, as "buses 310"). In some embodiments, buses 310 may include a memory interface circuit, e.g., a double data-rate (DDR) circuit having multiple ports (input/output). A traffic source 315 injects traffic 347 (e.g., data) to be processed by either of CPUs 301, and a traffic sink 330 removes data 349 form SoC 321 (e.g., to clear memories 320, or to send data 349 to an external memory or other SoC). Without limitation, traffic source 315 injects data 347 into memory 320-0. Thereafter, CPU 301-0 may access a data portion 345 from memory 320-0, to perform a first operation (e.g., run a background function). Likewise, CPU 301-1 may access a data portion 343 from memory 320-0 to perform a second operation (e.g., run a first function independent of the background function).

Accordingly, a SoC designer may use constrained analysis engine 101 to address the impact of frame rate on computation latency for the first function by SoC 321 under different environmental conditions. The SoC designer may then apply constraints to the different input parameters and output parameters (e.g., through constrained metric verification engine 103) to verify the performance of the SoC, which may be focused on the frame rate for executing the first function.

Figure 4:
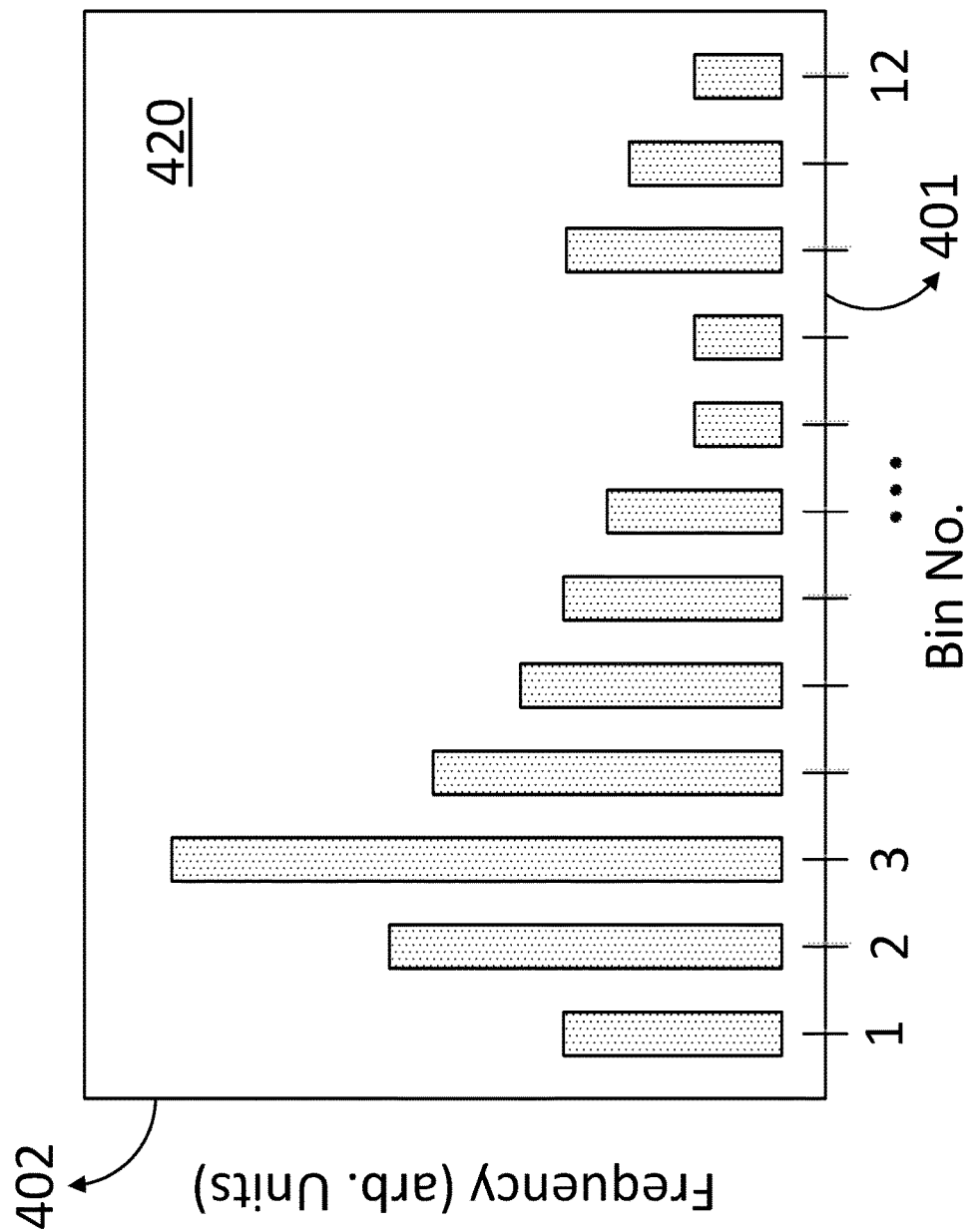
FIG. 4 illustrates a distribution of results from a random selection of input parameters in a SoC, according to some embodiments.

FIG. 4 illustrates a distribution 420 of output parameter values from a random selection of input parameters in a SoC simulation, according to some embodiments. For example, distribution 420 may include five thousand (5000), or more samples simulated by constrained analysis engine 101. Without limitation, a test environment for the SoC in distribution 420 may include a DDR interface having up to one hundred and forty (140) input parameters, while the output parameter may be selected as a read transaction latency of the DDR. Furthermore, in some embodiments it may be desirable to explore configurations for input parameter values resulting in a higher read latency of the DDR. Each sample corresponds to a configuration having randomly selected values for input parameters. Distribution 420 includes a frequency 402 of occurrence of the output value within a specific bin 401. Bins 401 span a range of parameter values from bin 1 (lowest parameter value with non-zero frequency 402), to bin 12 (highest parameter value with non-zero frequency). In some embodiments, the designer, according to certain design considerations, selects the number of bins in distribution 420. Moreover, in some embodiments each bin 401 may have the same width. Further, in some embodiments at least two or more contiguous bins 401 may be coalesced to form a partition of the output parameter range.

For each distribution 420 of output parameter values, each input parameter value may have a corresponding distribution (based on the random sampling or the constrained sampling performed by constrained analysis engine 101). The specific range of values for the output parameter and for any of the input parameters may be different along the abscissae of distribution 420 (e.g., nanoseconds for a latency output parameter, and kilobytes for a FIFO buffer length). In that regard, in some embodiments it is desirable that the number of bins spanning the parameter values be the same, or similar. In some embodiments, it is desirable that distribution 420 includes only non-zero frequency values. For example, in some embodiments distribution 420 may be selected so that at least the first bin and the last bin (e.g., bins 1 and 12, respectively) have non-zero frequency 402.

FIGS. 5A-H illustrate dependency charts 500A-H (collectively referred to, hereinafter, as "dependency charts 500") in a constrained metric verification engine, according to some embodiments. Charts 500 include multiple input parameters 502-1, 502-2, 502-3, 502-4, 502-5, 502-6, and 502-7 (hereinafter, collectively referred to as "input parameters 502"), and an output parameter 501. Input parameters 502 and output parameter 501 are associated with a SoC configuration, and may take different values within a range of values for each, according to a simulation (e.g., as performed by constrained analysis engine 101). In some embodiments, output parameter 501 may be a peak latency of a function operation in the SoC.

Figure 5A:
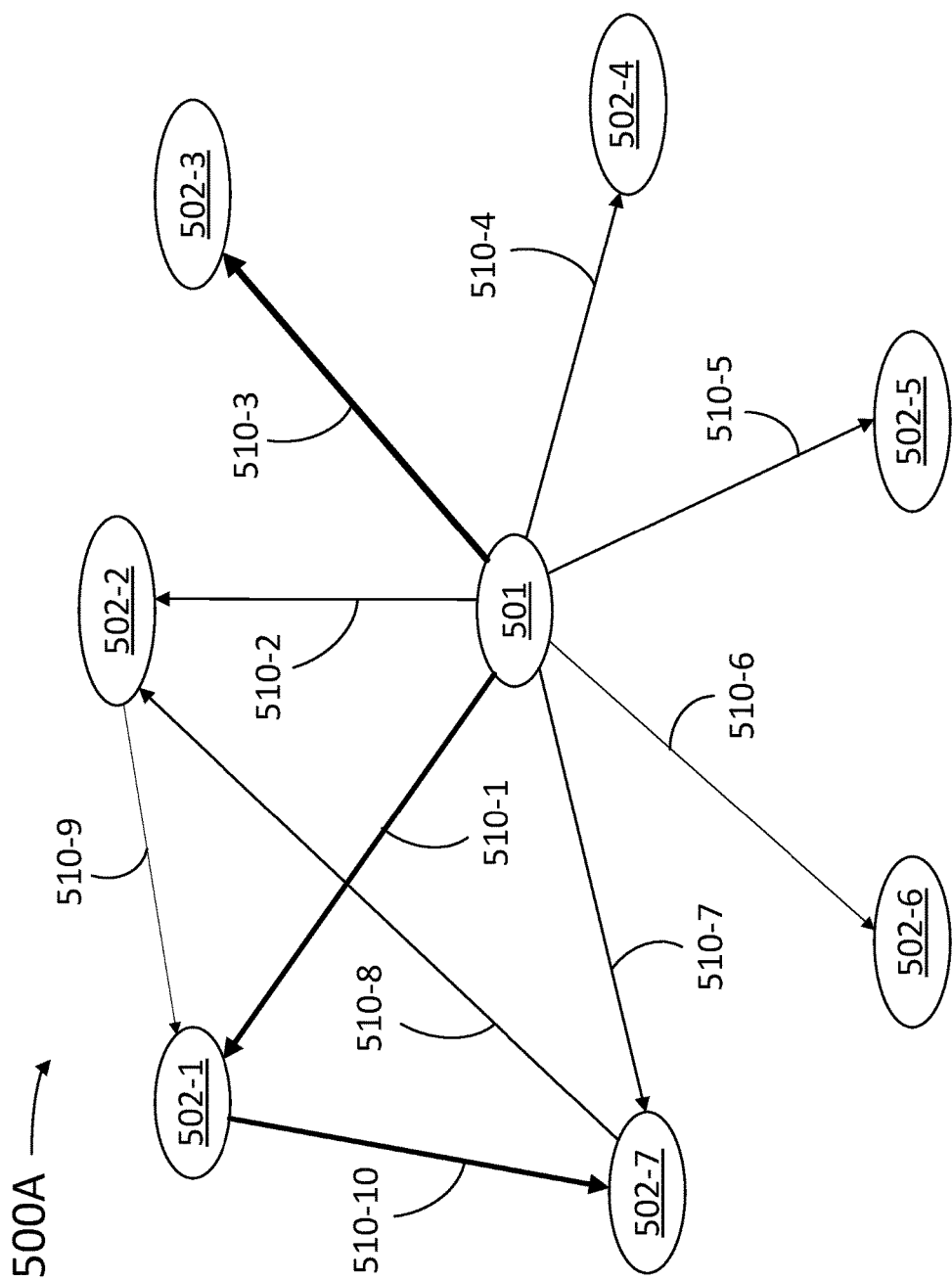

FIG. 5A illustrates dependency chart 500A depicting a strength of influence between controlled parameters and an observable parameter. Links 510-1, 510-2, 510-3, 510-4, 510-5, 510-6, 510-7, 510-8, 510-9, and 510-10 (hereinafter, collectively referred to as "links 510") indicate a dependency strength relating the two parameters associated by each link 510. Links 510 indicate the relational dependency with an arrow direction: the dependent parameter is at the start, and the varying parameter is at the head of the arrow. The dependency strength may be indicated by a thickness of the line joining the two parameters. In some embodiments, the thicker the line, the greater the dependency of output parameter 501 on the associated input parameter 502. A dependency value between output parameter 501 and any one of input parameters 502, or between any two of input parameters 502 (e.g., through links 510-8, 510-9, and 510-10) may be established by a cross-correlation statistical analysis of the results of multiple simulation samples by constrained analysis engine 101. As more iterations are performed, including constrained metric verification engine 103 and regression engine 105, dependency values may rapidly converge to a well differentiated chart as dependency chart 500A. In FIGS. 5B-H, link 510 joining output parameter 501 with input parameters 502 will be shown without specific thickness or highlights, for illustrative purposes, only.

Figure 5B:
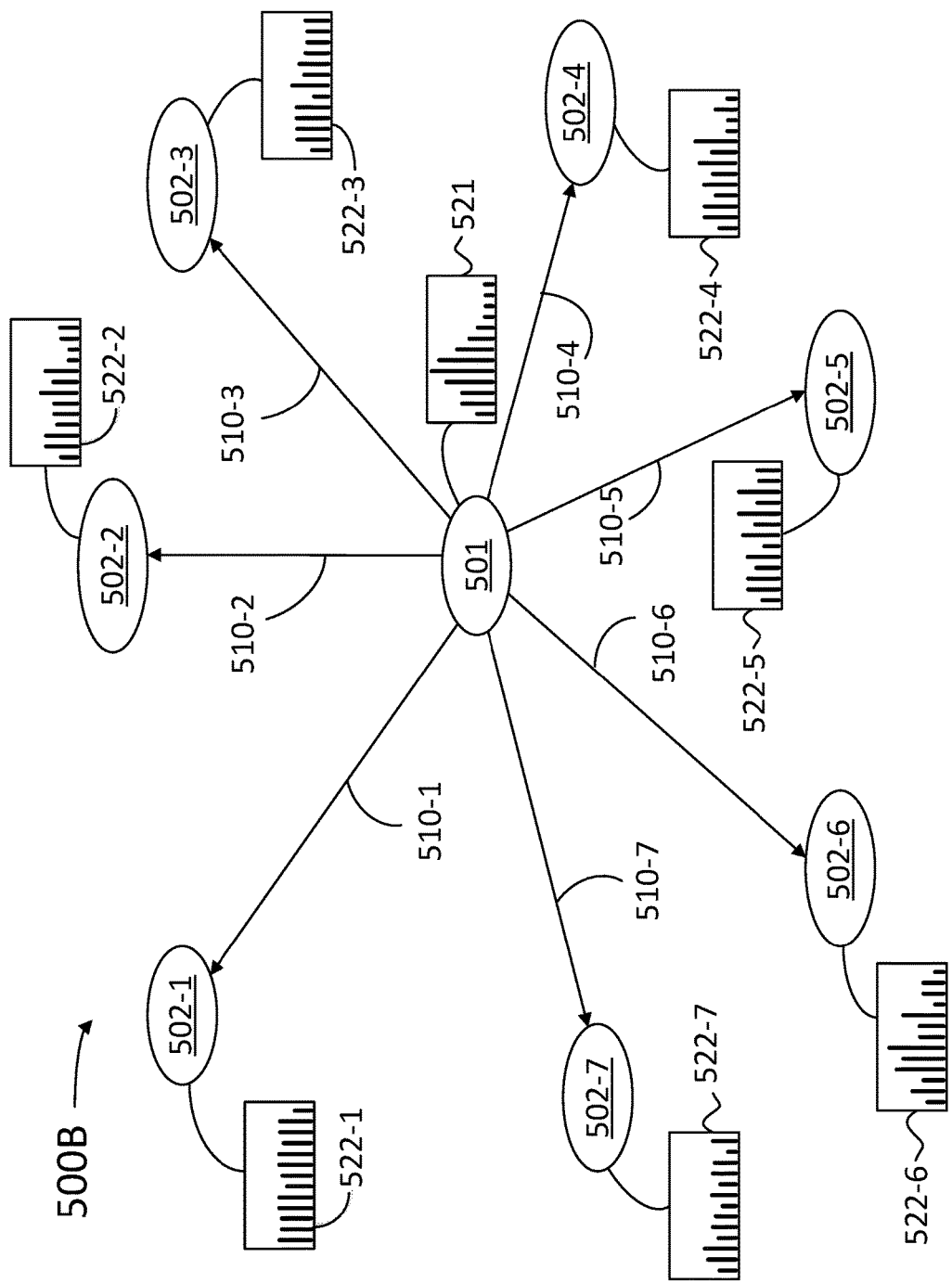

FIG. 5B illustrates dependency chart 500B depicting distributions 522-1, 522-2, 522-3, 522-4, 522-5, 522-6, and 522-7 (hereinafter, collectively referred to as "distributions 522") of input parameters 502 and a distribution 521 of output parameter 501 in a random selection of simulation data sets for a SoC.

Figure 5C:
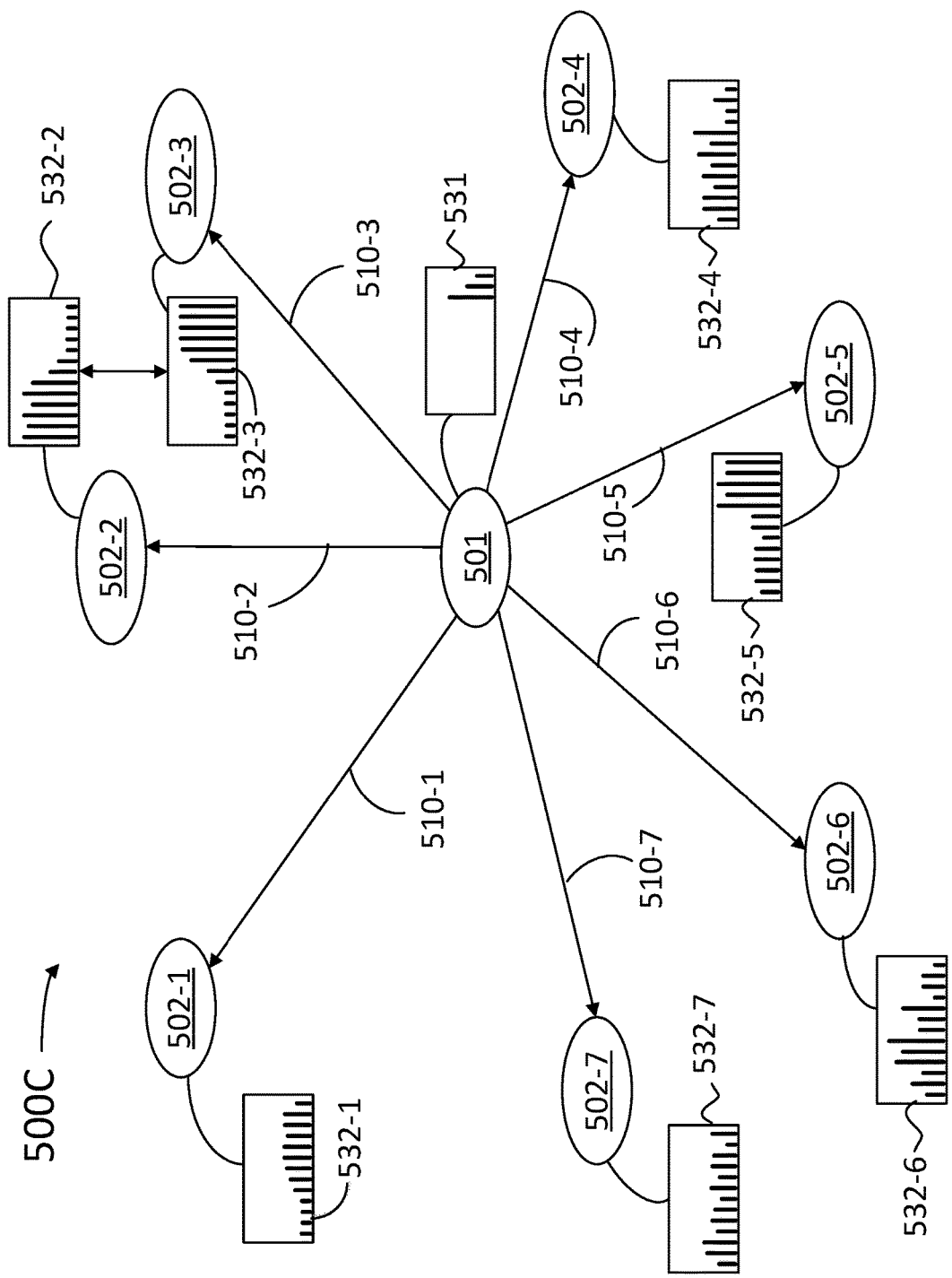

FIG. 5C illustrates dependency chart 500C depicting distributions 532-1, 532-2, 532-3, 532-4, 532-5, 532-6, and 532-7 (hereinafter, collectively referred to as "distributions 532") of input parameters 502 and a distribution 531 of output parameter 501 in a targeted selection of simulation data sets for the highest bins in distribution 531. Distributions 532-2 and 532-3 are indicative of a strong interdependency between input parameters 502-2 and 502-3 affecting output parameter 501 when it is constrained to the highest bins in distribution 531. Indeed, it can be seen that while input parameter 502-2 takes lower values, input parameter 502-3 tends to higher values for a bias towards higher values of output parameter 501. Accordingly, regression engine 105 may favor a combination of low/high input parameters 502-2/502-3 to achieve larger values of output parameter 501.

FIG. 5D illustrates dependency chart 500D depicting distributions 542-1, 542-2, 542-3, 542-4, 542-5, 542-6, and 542-7 (hereinafter, collectively referred to as "distributions 542") of input parameters 502 and a distribution 541 of output parameter 501 in a targeted selection of simulation data sets for the single highest bin in distribution 541. In dependency chart 500D, it is seen when an extreme bias is applied to output parameter 501, some input parameters show a remarkable distribution shift, e.g., input parameter 502-1. Indeed, distribution 542-1 shows a heavy shift towards lower bins compared to distribution 532-1, in which there is a heavier weight for higher bin values. Accordingly, regression engine 105 may favor lower values of input parameter 502-1 to drive extremely high values of output parameter 501 in a given SoC configuration.

Figure 5E:
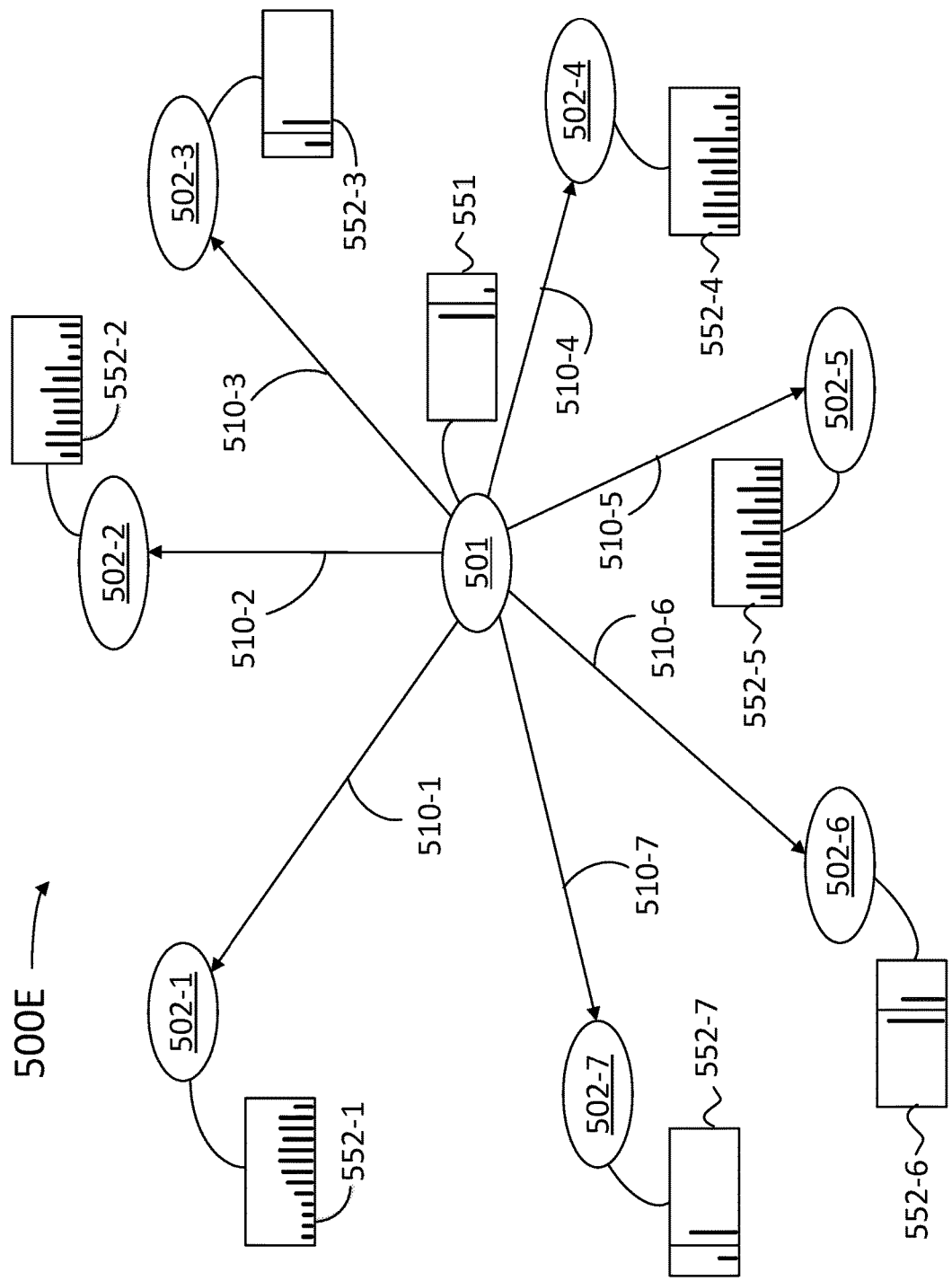

FIG. 5E illustrates dependency chart 500E depicting suitably partitioned distributions 552-3, 552-6, and 552-7 of the corresponding input parameters for a suitably partitioned distribution 551 of output parameter 501 selected from the simulation data sets for the SoC.

Figure 5F:
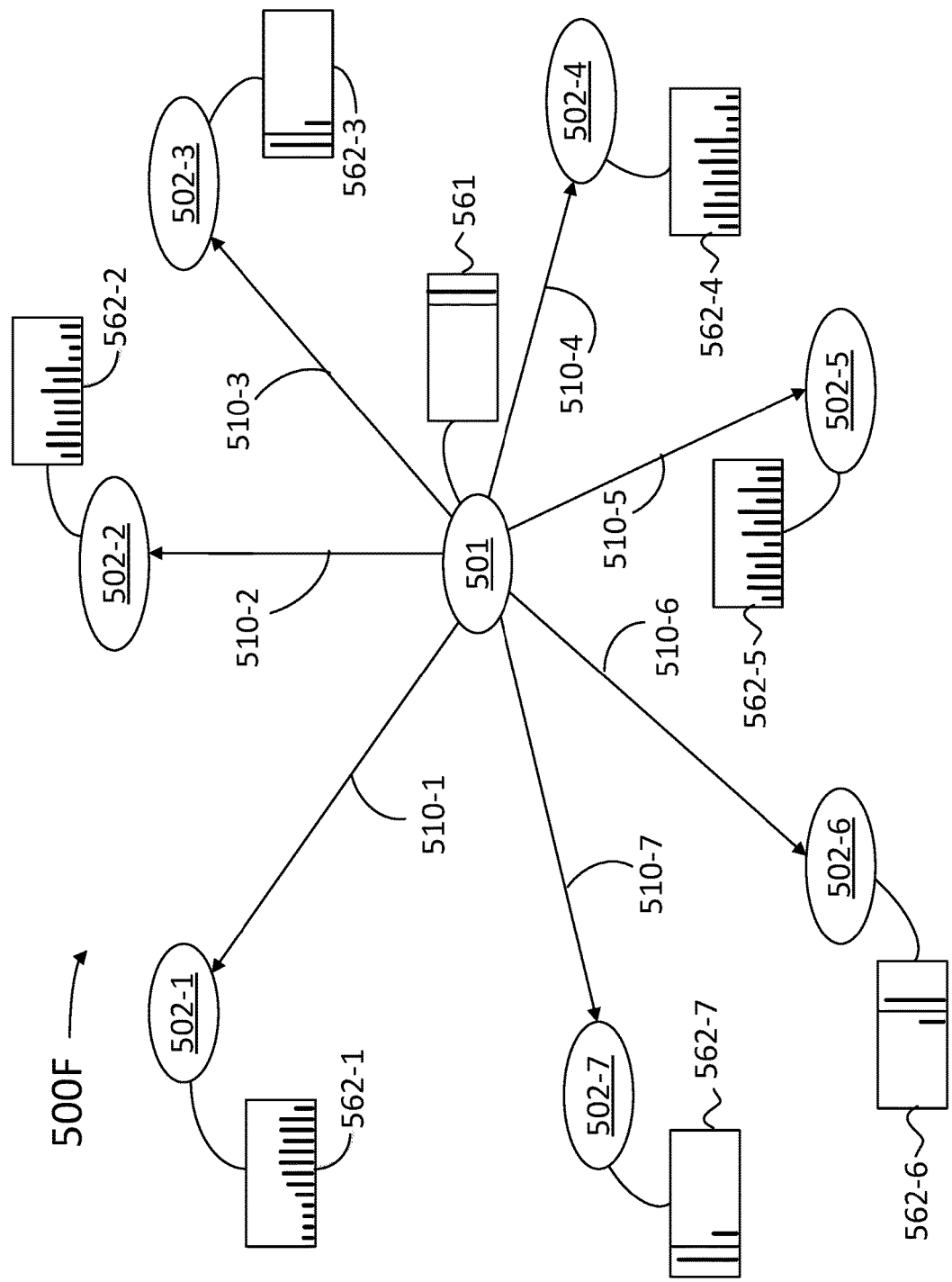

FIG. 5F illustrates dependency chart 500F depicting suitably partitioned distributions 562-3, 562-6, and 562-7 of the corresponding input parameters for a specific coverage range depicted by the highest partition element in distribution 561 for output parameter 501. Dependency chart 500F indicates that input parameters 502-3, 502-6 and 502-7 are strongly correlated with output parameter 501 achieving the selected coverage range. Using the results depicted in dependency chart 500F, regression engine 105 may determine that achieving the targeted range 561 for output parameter 501 may include SoC configurations having a reduced input parameter 502-3, a reduced input parameter 502-7, and an increased input parameter 502-6.

Figure 5G:
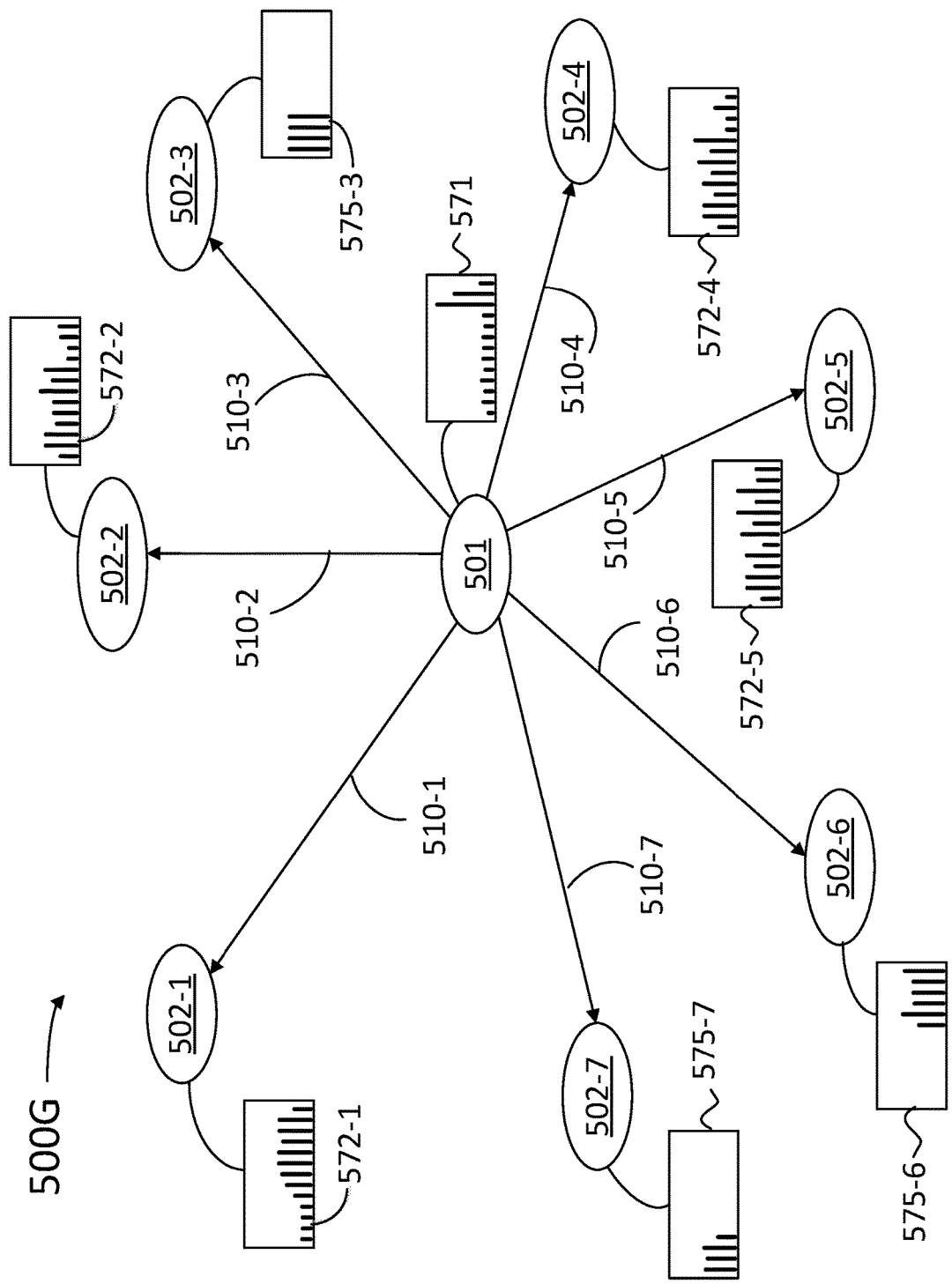

FIG. 5G illustrates dependency chart 500G depicting a predicted coverage range 571 of output parameter 501 when at least some of input parameters 502 have constrained distributions, e.g., input parameter 502-3 with constrained distribution 575-3, input parameter 502-6 with constrained distribution 575-6, and input parameter 502-7 with constrained distribution 575-7 (hereinafter, collectively referred to as "constrained distributions 575"). Accordingly, distributions 572-1, 572-2, 572-4, and 572-5 may be selected from any configuration that satisfies constrained distributions 575.

Figure 5H:
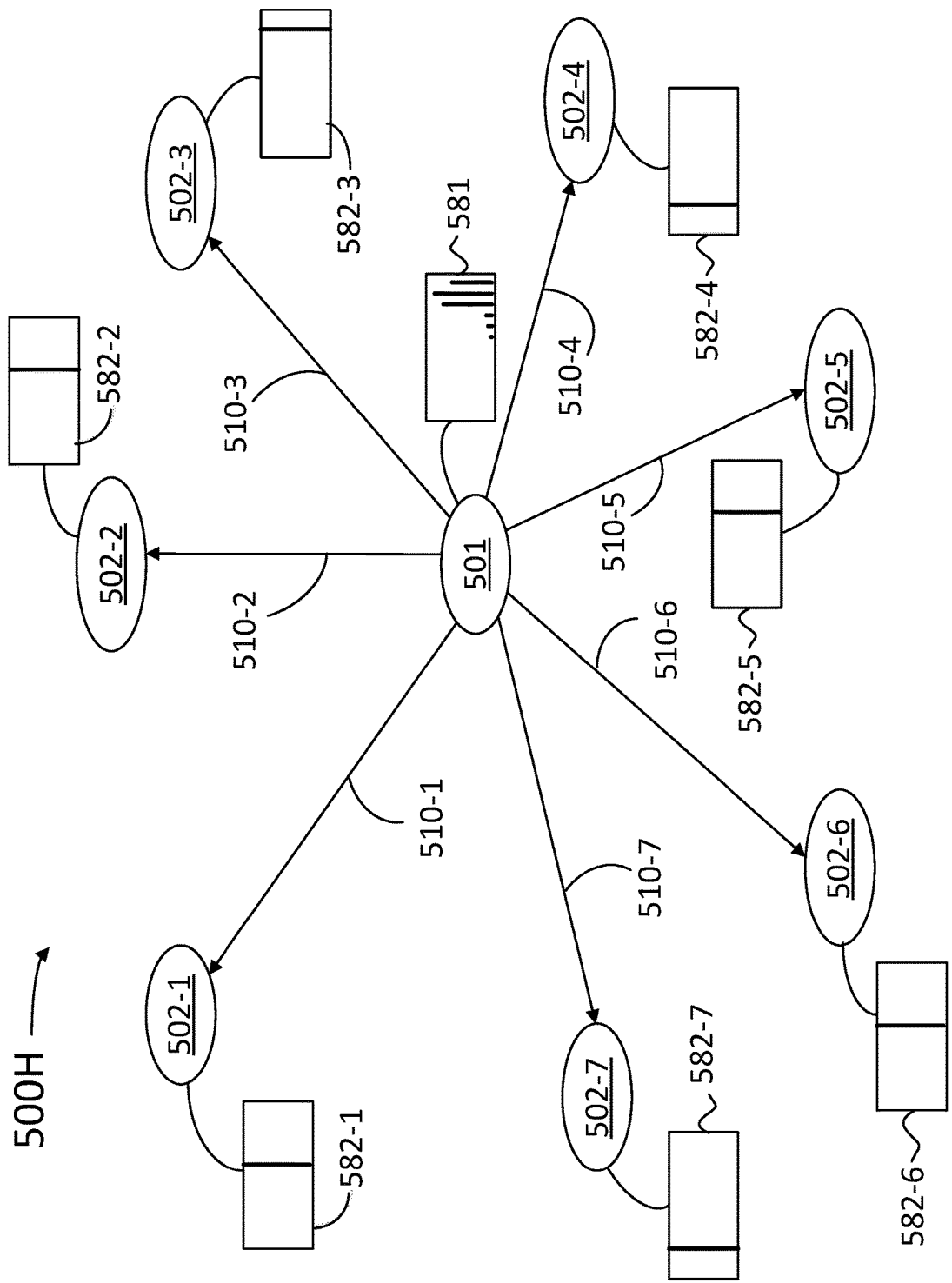

FIG. 5H illustrates dependency chart 500H depicting a predicted coverage range 581 of output parameter 501 after a second iteration of regression engine 105. Accordingly, iteratively constrained distributions 582-1, 582-2, 582-3, 582-4, 582-5, 582-6, and 582-7 (hereinafter, collectively referred to as "iteratively constrained distributions 582") may significantly narrow down the values for input parameters 502 that result in output parameter 501 achieving almost perfectly a targeted range of the three highest bin values in distribution 581.

Figure 6:
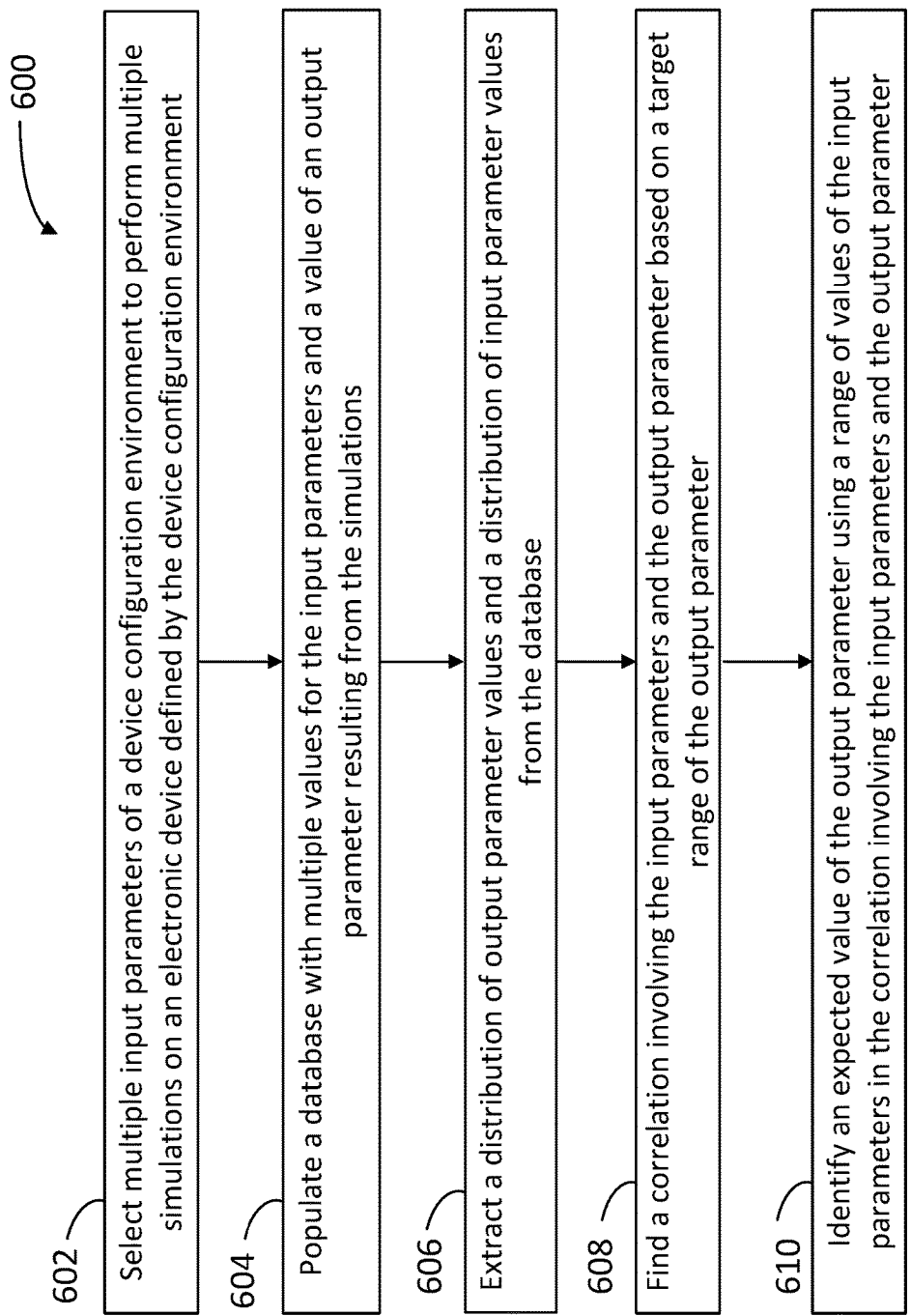
FIG. 6 illustrates a flow chart illustrating steps in a method for creating a tool that generates a desired target coverage in a SoC performance, according to some embodiments.

FIG. 6 is a flow chart illustrating steps in a method 600 for evaluating multiple design architectures for a SoC (e.g., SoC 121, or 321), according to some embodiments. At least some of the steps in method 600 may be performed by a computer having a processor executing commands stored in a memory of the computer (e.g., client host 102 or Server 100, processors 12 or 36, and memories 20 or 30). In some embodiments, at least some of the commands may be stored as part of a constrained analysis application installed in a computer (e.g., application 22 in client host 102, constrained analysis engine 101, constrained metric verification engine 103, or regression engine 105). Further, steps as disclosed in method 600 may include retrieving, editing, and/or storing files in a database that is part of, or is communicably coupled to, the computer (e.g., regression coverage database 140). Methods consistent with the present disclosure may include at least some, but not all of the steps illustrated in method 600, performed in a different sequence. Furthermore, methods consistent with the present disclosure may include at least two or more steps as in method 600, performed overlapping in time, or almost simultaneously.

In some embodiments, at least one or more of the steps in method 600 may be performed in a cloud computing environment, wherein a computer may include servers, such as a master server and a slave server. Accordingly, at least some of the steps illustrated in method 600 may be performed in parallel in different processors, following separate computational threads. For example, each of the separate computational threads may be performed by at least one of slave servers in each of multiple applications and processors dedicated to the specific computational thread.

Step 602 includes selecting multiple input parameters of a device configuration environment to perform multiple simulations on an electronic device defined by the device configuration environment. In some embodiments, step 602 includes selecting the input parameter from a controlled parameter and an environmental parameter in the device configuration environment. In some embodiments, step 602 includes selecting at least one of the multiple input parameters based on a verification concern from an undesirable range of values for the output parameter. In some embodiments, step 602 includes selecting a range of values for the output parameter that is particularly concerning for a device performance, and selecting the multiple input parameters based on the range of values of the output parameter.

Step 604 includes populating a database with multiple values for the input parameters and a value of an output parameter resulting from the simulations. In some embodiments, step 604 includes populating the database with multiple input parameters and an output parameter resulting from a simulation of the SoC. In some embodiments, step 604 includes selecting the output parameter from multiple output parameters according to a desired performance of the electronic device. In some embodiments, step 604 includes forming, in a display, a chart illustrating a strength of a dependency of the output parameter on the input parameters.

Step 606 includes extracting a distribution of output parameter values and a distribution of input parameter values from the database. In some embodiments, step 606 includes selecting an input parameter from multiple input parameters according to a desired performance of the electronic device. In some embodiments, step 606 includes forming, on a display, a graph including the output parameter, the distribution of output parameter values, the input parameter, and the distribution of input parameter values. In some embodiments, step 606 includes selecting a number of non-empty bins for a range of input parameter values and a same number of non-empty bins for a range of output parameter values.

Step 608 includes finding a correlation involving the input parameters and the output parameter based on a target range of the output parameter. In some embodiments, step 608 includes selecting a constraint for at least one of the input parameters based on the distribution of input parameter values and on the target range. In some embodiments, step 608 includes forming a partition of values for the output parameter and a partition of values for at least one of the input parameters selected from the database, the partition of values for the output parameter including the target range. Accordingly, step 608 may further include identifying a change in the partition of values for the at least one input parameter when a device configuration includes an output parameter value within the target range.

Step 610 includes identifying an expected value of the output parameter using a value of the input parameter from an arbitrary device configuration in the correlation between the input parameter and the output parameter. In some embodiments, step 610 includes identifying one or more device configurations that satisfy the target range.

Figure 7:
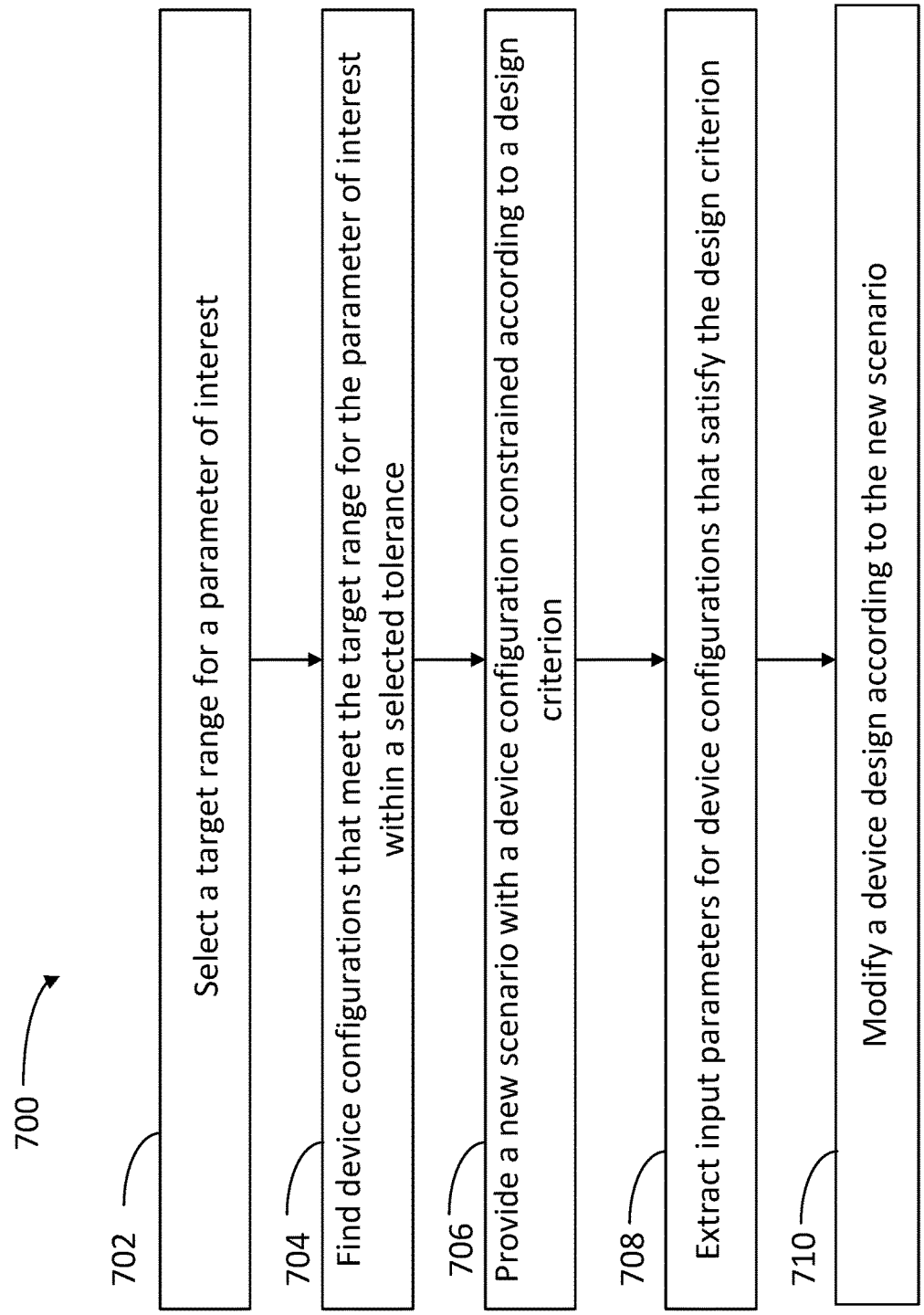
FIG. 7 illustrates a flow chart illustrating steps in a method for generating a target coverage of an observable parameter in a SoC performance, according to some embodiments.

FIG. 7 is a flow chart illustrating steps in a method 700 for evaluating a statistical sensitivity in a design architecture of a SoC, according to some embodiments (e.g., SoC 121, or 321). At least some of the steps in method 700 may be performed by a computer having a processor executing commands stored in a memory of the computer (e.g., client host 102 or server 100, processors 12 or 36, and memories 20 or 30). In some embodiments, at least some of the commands may be stored as part of an analysis engine application installed in a computer (e.g., application 22 in client host 102, constrained analysis engine 101, constrained metric verification engine 103, or regression engine 105). Further, steps as disclosed in method 700 may include retrieving, editing, and/or storing files in a database that is part of, or is communicably coupled to, the computer (e.g., regression coverage database 140). Methods consistent with the present disclosure may include at least some, but not all of the steps illustrated in method 700, performed in a different sequence. Furthermore, methods consistent with the present disclosure may include at least two or more steps as in method 700, performed overlapping in time, or almost simultaneously.

In some embodiments, at least one or more of the steps in method 700 may be performed in a cloud computing environment, wherein a computer may include servers, such as a master server and a slave server. Accordingly, at least some of the steps illustrated in method 700 may be performed in parallel in different processors, following separate computational threads. For example, each of the separate computational threads may be performed by at least one of slave servers in each of multiple applications and processors dedicated to the specific computational thread.

Step 702 includes selecting a target range for a parameter of interest. For example, in some embodiments the parameter of interest may include a peak delay for a function in a SoC, and step 702 may include selecting a range that is higher than 150 picoseconds (ps), up to 200 ps, 300 ps, or the maximum peak delay value available in the database.

Step 704 includes finding device configurations that meet the target range for the parameter of interest within a selected tolerance. For example, in some embodiments step 704 may include forming a dependency chart (e.g., dependency charts 500), and determining that a reduced value for a read/write weight of a first port in a memory interface of the SoC (e.g., input parameter 502-2), combined with an increased value for a read/write weight of a second port in the memory interface for the SoC (e.g., input parameter 502-3) may result in a peak delay value that is higher than 150 ps, with a high probability.

Step 706 includes providing a new scenario with a device configuration constrained according to a design criterion. In some embodiments, step 706 may include determining, from the design criterion (e.g., a peak delay for the SoC function between 150 ps and 200 ps) one or more bins in a distribution for output parameter values. Accordingly, step 706 may include selecting output parameter values from a specific number of bins, or a single bin, in a distribution for the output parameter in the device configuration. In some embodiments, step 706 may include obtaining the distribution of output parameter values from simulation data stored in the database.

Step 708 includes extracting input parameters for device configurations that satisfy the design criterion. In some embodiments, step 708 may include retrieving, from the database, a distribution of a selected input parameter values from the database, the selected input parameter values being associated with output parameter values targeting the design criterion.

Step 710 includes modifying a device design according to the new scenario. In some embodiments, step 710 may include increasing a bandwidth of a port in a memory interface of the SoC to reduce a peak latency of the SoC function under specific environmental conditions, e.g., power, voltage and temperature (PVT) conditions. In some embodiments, step 710 may include finding an input parameter threshold so that the device design operates in the new scenario.

Hardware Overview

Figure 8:
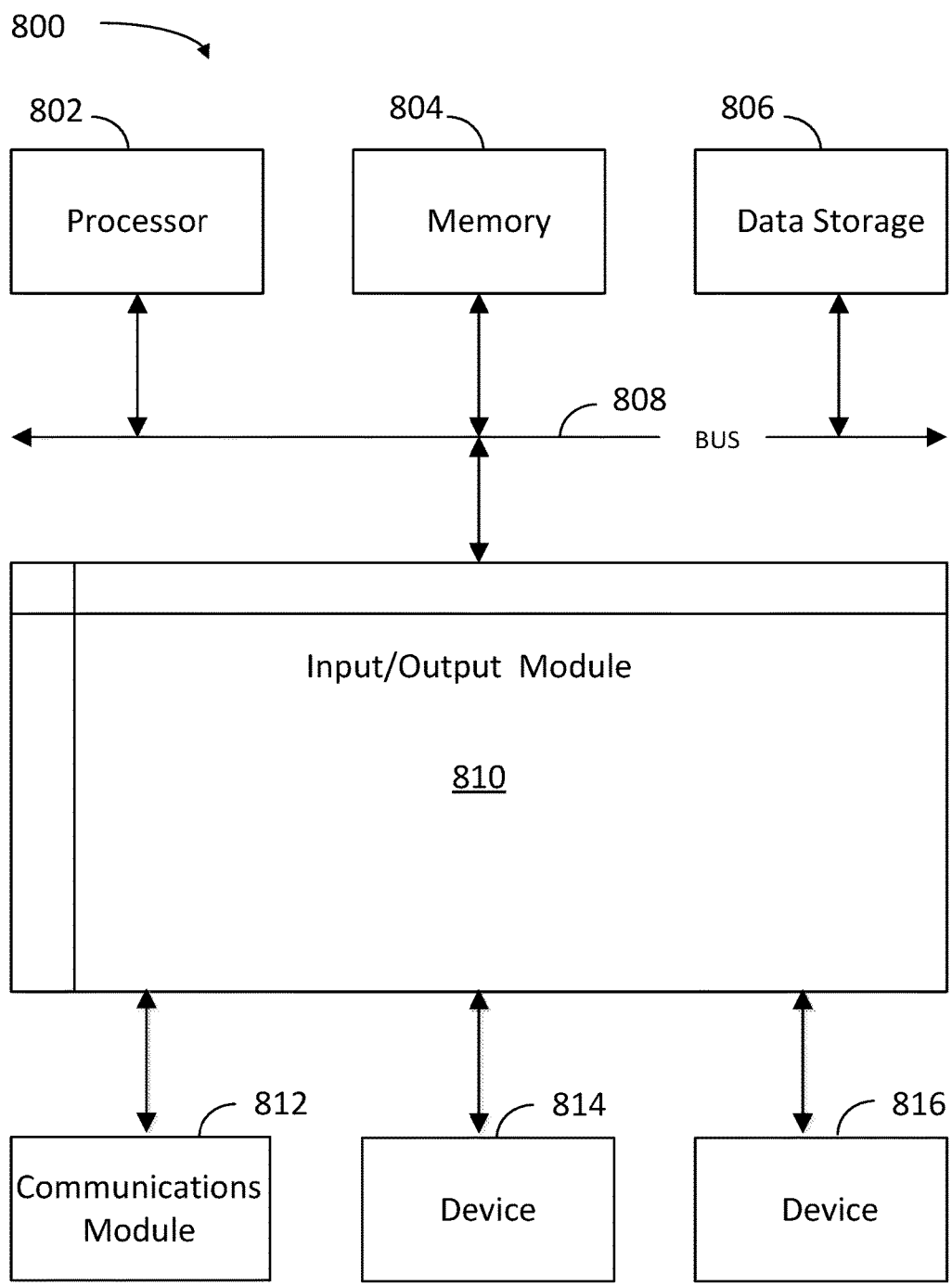
FIG. 8 is a block diagram illustrating an example computer system for generating a target coverage of an observable parameter in a SoC performance, according to some embodiments.

FIG. 8 is a block diagram illustrating an example computer system 800 with which the methods and steps illustrated in methods 600-700 can be implemented, according to some embodiments. In certain aspects, computer system 800 can be implemented using hardware or a combination of software and hardware, either in a dedicated server, integrated into another entity, or distributed across multiple entities.

Computer system 800 includes a bus 808 or other communication mechanism for communicating information, and a processor 802 coupled with bus 808 for processing information. By way of example, computer system 800 can be implemented with one or more processors 802. Processor 802 can be a general-purpose microprocessor, a microcontroller, a Digital Signal Processor (DSP), an ASIC, a Field Programmable Gate Array (FPGA), a Programmable Logic Device (PLD), a controller, a state machine, gated logic, discrete hardware components, or any other suitable entity that can perform calculations or other manipulations of information. In some embodiments, processor 802 may include modules and circuits configured as a 'placing' tool or engine, or a 'routing' tool or engine, to place devices and route channels in a circuit layout, respectively and as disclosed herein.

Computer system 800 includes, in addition to hardware, code that creates an execution environment for the computer program in question, e.g., code that constitutes processor firmware, a protocol stack, a database management system, an operating system, or a combination of one or more of them stored in an included memory 804, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. Processor 802 and memory 804 can be supplemented by, or incorporated in, special purpose logic circuitry.

The instructions may be stored in memory 804 and implemented in one or more computer program products, e.g., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototypebased languages, off-side rule languages, procedural languages, reflective languages, rule-based languages, scripting languages, stack-based languages, synchronous languages, syntax handling languages, visual languages, Wirth languages, embeddable languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions.

Computer system 800 is coupled via input/output module 810 to various devices. The input/output module 810 is any input/output module. Example input/output modules 810 include data ports such as USB ports. The input/output module 810 is configured to connect to a communications module 812. Example communications modules 812 include networking interface cards, such as Ethernet cards and modems. In certain aspects, the input/output module 810 is configured to connect to a plurality of devices, such as an input device 814 and/or an output device 816. Example input devices 814 include a keyboard and a pointing device, e.g., a mouse or a trackball, by which a user can provide input to the computer system 800. Other kinds of input devices 814 are used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 816 include display devices, such as a light emitting diode (LED), a cathode ray tube (CRT), or a liquid crystal display (LCD) screen, for displaying information to the user.

Methods as disclosed herein may be performed by computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein (e.g., as in methods 600-700). One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 800 includes servers and personal computer devices. A personal computing device and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 802 for execution. Such a medium may take many forms, including, but not limited to, non-volatile media, volatile media, and transmission media. Non-volatile media include, for example, optical disks, magnetic disks, or flash memory, such as data storage device 806. Volatile media include dynamic memory, such as memory 804. Transmission media include coaxial cables, copper wire, and fiber optics, including the wires that comprise bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

In one aspect, a term field effect transistor (FET) may refer to any of a variety of multi-terminal transistors generally operating on the principals of controlling an electric field to control the shape and hence the conductivity of a channel of one type of charge carrier in a semiconductor material, including, but not limited to a metal oxide semiconductor field effect transistor (MOSFET), a junction FET (JFET), a metal semiconductor FET (MESFET), a high electron mobility transistor (HEMT), a modulation doped FET (MODFET), an insulated gate bipolar transistor (IGBT), a fast reverse epitaxial diode FET (FREDFET), and an ion-sensitive FET (ISFET).

To the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A computer-implemented method, comprising:
   selecting multiple input parameters of a device configuration environment to perform multiple simulations on an electronic device defined by the device configuration environment;
   populating a database with multiple values for the multiple input parameters and a value of an output parameter resulting from the simulations, wherein the database indicates a dependency strength of the output parameter on at least one input parameter of the multiple input parameters;
   extracting a distribution of output parameter values and a distribution of input parameter values from the database;
   finding a correlation involving the multiple input parameters and the output parameter based on a target range of the output parameter; and
   identifying an expected value of the output parameter using a range of values of the multiple input parameters in the correlation involving the multiple input parameters and the output parameter.

2. The computer-implemented method of claim 1, further comprising selecting a range of values for the output parameter that is particularly concerning for a device performance.

3. The computer-implemented method of claim 1, further comprising selecting an input parameter of the multiple input parameters according to a verification concern, the verification concern comprising a range of values for the output parameter that is particularly concerning for a device performance.

4. The computer-implemented method of claim 1, wherein the extracting a distribution of input parameter values comprises selecting an input parameter from the multiple input parameters according to a desired performance of the electronic device.

5. The computer-implemented method of claim 1, wherein the extracting a distribution of output parameter values and a distribution of input parameter values comprises forming a display indicative of the output parameter, of the distribution of output parameter values, of an input parameter of the multiple input parameters, and of the distribution of input parameter values.

6. The computer-implemented method of claim 1, wherein the extracting a distribution of output parameter values and a distribution of input parameter values from the database comprises forming a first partition of a range of the input parameter values and a second partition of a range of the output parameter values.

7. The computer-implemented method of claim 1, wherein the finding a correlation involving the multiple input parameters and the output parameter based on a target range comprises selecting a constraint for at least one of the multiple input parameters based on the distribution of the input parameter values, on the distribution of the output parameter values, and on the target range.

8. The computer-implemented method of claim 1, wherein the finding a correlation involving the multiple input parameters and the output parameter based on a target range comprises:
   forming a partition of the output parameter values and a partition of the input parameter values selected from the database, the partition of the output parameter values comprising the target range; and
   identifying a change in the partition of the input parameter values when a device configuration comprises an output parameter value within the target range.

9. The computer-implemented method of claim 1, further comprising identifying one or more device configuration environments that satisfy the target range.

10. A system, comprising:
    a memory, storing instructions; and
    at least one processor that executes the instructions to:
       select multiple input parameters of a device configuration environment to perform multiple simulations on an electronic device defined by the device configuration environment;
       populate a database with multiple values for the multiple input parameters and a value of an output parameter resulting from the multiple simulations, wherein the database indicates a dependency strength of the output parameter on at least one input parameter of the multiple input parameters;
       extract a distribution of output parameter values and a distribution of input parameter values from the database;
       find a correlation between the multiple input parameter and the output parameter based on a target range of the output parameter; and
       identify an expected value of the output parameter using a value of the input parameter in the correlation between the input parameter and the output parameter.

11. The system of claim 10, wherein the at least one processor further executes the instructions to select a range of values for the output parameter that is particularly concerning for a device performance.

12. The system of claim 10, wherein the at least one processor further executes the instructions to select an input parameter of the multiple input parameters according to a verification concern, the verification concern comprising a range of values for the output parameter that is particularly concerning for a device performance.

13. The system of claim 10, wherein, to extract a distribution of input parameter values, the at least one processor further executes instructions to select an input parameter from the multiple input parameters according to a desired performance of the electronic device.

14. The system of claim 10, wherein the at least one processor further executes the instructions to select a verification concern from a range of output parameter values that is particularly concerning for a device performance.

15. The system of claim 10, wherein, to find a correlation involving the multiple input parameters and the output parameter based on the target range, the at least one processor further executes instructions to select a constraint for at least one input parameter based on the distribution of input parameter values, and on the target range.

16. The system of claim 10, wherein, to find a correlation involving the multiple input parameters and the output parameter based on the target range, the at least one processor further executes instructions to:

form a partition of the output parameter values and a partition of the input parameter values selected from the database, the partition of the output parameter values comprising the target range; and identify a change in the partition of the input parameter values when a device configuration comprises an output parameter value within the target range.

17. The system of claim 10, wherein the at least one processor further executes instructions to identify one or more device configuration environments that satisfy the target range.

18. A non-transitory, computer-readable medium comprising instructions stored in a memory which, when executed by a processor, cause a computer to perform a method, the method comprising:

determining multiple output parameters of an electronic device defined by a device configuration comprising an input parameter;

populating a database with the input parameter and the multiple output parameters wherein the database indicates a dependency strength of at least one output parameter on the input parameter;

extracting a distribution of output parameter values and a distribution of input parameter values from the database;

finding a correlation between the input parameter and the multiple output parameters based on a target range of the multiple output parameters; and identifying an expected value of one output parameter of the multiple output parameters using a value of the input parameter from an arbitrary device configuration in the correlation between the input parameter and said one output parameter.

19. The non-transitory, computer-readable medium of claim 18, wherein the method further comprises selecting a range of values for said one output parameter that is particularly concerning for a device performance.

* * * * *